United States Patent [19]

Hamilton

[11] Patent Number: 4,751,598
[45] Date of Patent: Jun. 14, 1988

[54] THIN-FILM, CROSS-FIELD, CLOSED-FLUX, ANISOTROPIC ELECTROMAGNETIC FIELD DEVICE

[75] Inventor: Harold J. Hamilton, Santa Clara, Calif.

[73] Assignee: Censtor Corporation, San Jose, Calif.

[21] Appl. No.: 697,153

[22] Filed: Feb. 1, 1985

[51] Int. Cl.⁴ .................... G11B 5/127; G11B 5/17; G11B 5/31; G11B 5/33

[52] U.S. Cl. .................... 360/110; 360/123; 360/125; 360/126; 360/111

[58] Field of Search ............ 360/110, 111, 113, 121, 360/123, 125, 126, 115, 117; 324/244, 253, 258, 259

[56] References Cited

U.S. PATENT DOCUMENTS

| | | | |
|---|---|---|---|
| 3,165,722 | 1/1965 | Ghisler | 360/111 X |
| 3,456,250 | 7/1969 | Barcaro et al. | 360/111 |
| 3,626,396 | 12/1971 | Eastman et al. | 360/123 |
| 3,633,188 | 1/1972 | Bittmann | 360/111 |
| 3,683,407 | 8/1972 | Paul et al. | 360/123 |
| 3,829,894 | 8/1974 | Watanabe et al. | 360/111 |
| 4,092,688 | 5/1978 | Nomura et al. | 360/121 |
| 4,137,554 | 1/1979 | McClure | 360/111 |

Primary Examiner—Stuart N. Hecker
Assistant Examiner—Benjamin E. Urcia
Attorney, Agent, or Firm—Kolisch, Hartwell, Dickinson

[57] ABSTRACT

A thin-film, cross-field, closed-flux, anisotropic electromagnetic field device for recording images on and reading them from magnetic media, such as a magnetic disk, tape or drum. The device is characterized by two orthogonally related conductors which couple electromagnetically with magnetic coupling structure. One portion of such structure substantially completely surrounds one of the conductors relative to the direction of current flow therein, this portion being anisotropic, and having an easy axis of magnetization that parallels such current flow. With the device in use, this easy axis is intended for operative coupling alignment normally relative to the recording surface in the selected recording medium.

23 Claims, 7 Drawing Sheets

THIN-FILM, CROSS-FIELD, CLOSED-FLUX, ANISOTROPIC ELECTROMAGNETIC FIELD DEVICE

BACKGROUND AND SUMMARY OF THE INVENTION

This invention pertains to a thin-film, cross-field, closed-flux anisotropic electromagnetic read/write head (field device) for recording magnetic images on and for reading them from magnetic media, such as a magnetic disk, tape or drum.

DESCRIPTION OF THE PRIOR ART

Recent progress in digital magnetic recording technology, with regard to prior limitations and efforts to overcome the same, have been summarized in my prior U.S. Pat. No. 4,423,450, entitled "Magnetic Head and Multitrack Transducer for Perpendicular Recording and Method for Fabricating", issued Dec. 27, 1983. The invention disclosed in that patent specifically provides improvements in recording density, and in the amplitudes of read signals in the perpendicular recording mode, through the incorporation of a flux gate as an integral part of the main pole of a read/write head. Such incorporation makes signal amplitude and waveform independent of the relative velocity of the selected recording medium. Also, the incorporation of a flux gate enables fabrication, by thin-film manufacturing processes, of multi-track heads which utilize a common record/sense winding, with the flux gate in each head serving as a means to address a particular head, as well as to produce large-amplitude signals independent of medium velocity (during a reading operating). Such a common winding facilitates extremely close spacing of individual heads and, accordingly, the fabrication of multi-element, high-density head arrays.

The requirement, for example, for disk drives with high-track as well as linear density, and the need to improve signal-to-noise ratios in order to facilitate signal processing and to improve reliability, point to the desirability of further increasing read-signal amplitude while retaining or enhancing the other important capabilities mentioned above. According to conventional technology, this can only be achieved (1) by increasing the remanant flux density in the recording medium (other things being equal), (2) increasing the efficiency of the head medium magnetic circuit so that a greater percentage of the remanant flux passes through a head, (3) increasing the rate of change of flux by making a flux transition narrower, or (4) increasing the relative velocity of the medium.

Other possibilities exist for non-conventional transducers, for example, by increasing the sensitivity of Hall or magnetoresistive-type sensors, or by increasing the switching rate of flux-gate-type transducers. Nevertheless, it is apparent that, while such non-conventional means of signal detection have a potential advantage over conventional inductive-type sensors, because they generate signals whose amplitudes are independent of medium velocity, the signal amplitudes produced by all of such sensors are directly dependent upon the magnitude of the remanant flux in a medium.

U.S. Pat. No. 3,633,188 to Bittmann, entitled "Electromagnetic Transducer Employing a Thin Magnelio Film Having an Oriented Easy Direction of Magnetization," issued Jan. 4, 1972, proposes a structure which is distinct in that the total flux coupled to the sense winding in a read/write head is potentially many times that available from the medium. Put another way, the head behaves as a flux amplifier. Unlike conventional read/write heads, a Bittmann-type head yields a signal which derives principally from the release of magnetic (anisotropic) energy stored in the head, and not from stored magnetic energy in a medium. Using such a head, the remanant flux in a medium serves to bias the magnetization process in the head—causing the head's main pole to saturate in an easy-axis direction corresponding to the polarity of medium magnetization. The head is energized from an external source, and resulting read signal amplitude and waveform are independent of the motion of a medium, such as is also true with flux-gate-type heads. The disclosed Bittmann head structures are what might be thought of as "open-flux"-type devices, in the sense that no means are provided in either the head/medium magnetic circuit, or in the orthogonal energizing magnetic circuit, to minimize demagnetizing fields (which degrade performance as will be discussed later).

The same means of signal detection, utilizing flux amplification, is employed in the device described by Kaske, Oberg, Paul and Sauter, "Vapor-Deposited Thin-Film Recording Heads", *IEEE Transitions on Magnetics*, September, 1971. This device is similar in structure to a "horizontal"-type, narrow-gap, thin-film head, and therefore provides a substantially closed flux path in the principal head/medium magnetic circuit. However, the orthogonal hard-axis energizing field is generated in an open-flux magnetic circuit which leads to large demagnetizing fields which, as a consequence, require large energizing current. This limitation significantly reduces the utility of such a device.

While devices like those described by Bittmann and by Kaske et al. hold promise of increasing significantly the amplitude of a read signal, performance and implementation limitations underscore the need for further improvements in the design of magnetic recording/reading transducers.

OBJECTS OF THE INVENTION

A general object of the present invention, accordingly, is to provide an improved transducer (read/write head) for use in high-density magnetic recording, which transducer significantly overcomes limitations in the prior-art technology outlined above.

More particularly, an object of the invention is to provide such a transducer which, in a read-mode operation, and through release of stored anisotropic energy, generates an output signal that is appreciably larger than output signals produced by known prior art devices.

A further object of the instant invention is to provide a transducer of the type just generally outlined which enables fabrication in multiple high-density arrays.

According to a preferred embodiment of the invention, the same takes the form of a thin-film, closed-flux, cross-field, anisotropic, electromagnetic field device characterized by two orthogonally related conductors which couple electromagnetically with thin-film magnetic coupling structure in the device. One portion of this coupling structure substantially completely surrounds one of the conductors, relative to the direction of current flow in that conductor, with this structure portion having an easy axis of magnetization which parallels such current flow. With the device in use, this easy axis is intended for operative coupling alignment normally relative to the recording surface in the selected recording medium.

In certain embodiments disclosed herein, this "surrounding" magnetic portion in fact completely surrounds the conductor mentioned. In other embodiments, it exposes only the lateral edges of the associated conductor.

Various other objects, advantages and features of the invention will become more fully apparent when the descriptions below are read in conjunction with the accompanying drawings.

DESCRIPTIONS OF THE PRIOR ART DEVICES

Figure 1:
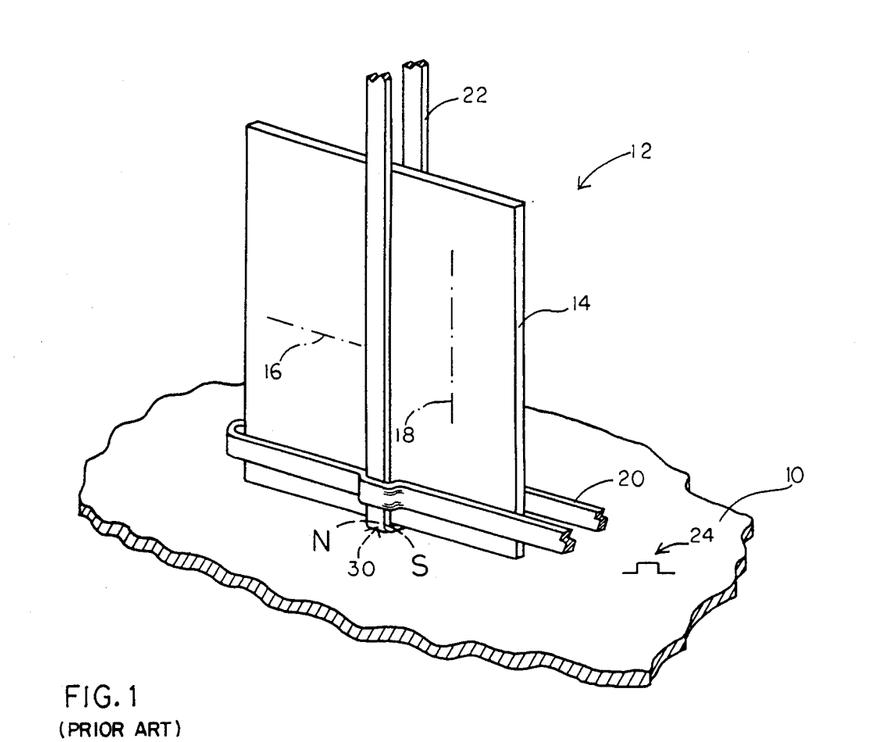
FIG. 1 is a simplified, fragmentary, perspective view illustrating a prior art transducer of the type disclosed as one embodiment in the above-identified Bittmann patent.

Further elaboration regarding the structures and operations of certain key prior-art devices, generally discussed earlier, is important as a basis for appreciating the significance of the advances and contributions made by the present invention. So, turning attention first to FIG. 1, here there is shown one form of a Bittmann-type transducer which is structured for working with longitudinally oriented fields in a medium, such as recording surface 10 in a magnetic recording disk. FIG. 1 is a highly schematic drawing, and it omits all but that structure which is essential to an understanding of how the transducer is organized and how it works. The device, which is shown generally at 12, includes a thin, anisotropic, high-permeability magnetic film 14 suitably deposited on a rigid, smooth, nonmagnetic substrate (not shown). Film 14 has an easy axis of magnetization which extends generally in the direction of dash-dot line 16, and a hard axis of magnetization which extends generally in the direction of dash-dot line 18. Film 14 is inductively coupled to two orthogonal conductors 20, 22, with conductor 20 operating as what will be referred to herein as a drive conductor, and conductor 22 operating as what will be called a sense conductor.

Figure 2:
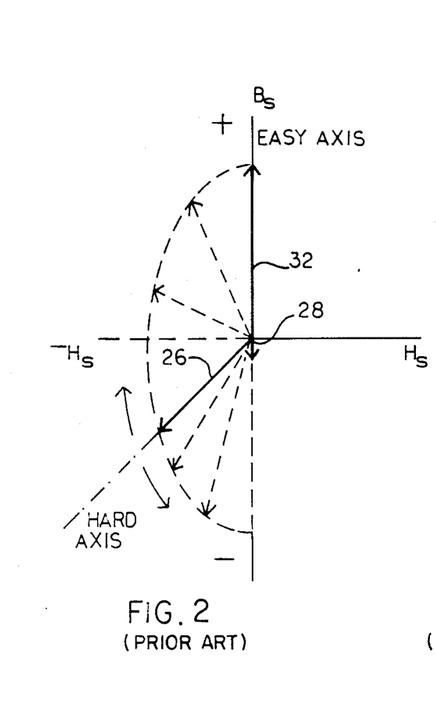
FIG. 2 is provided to aid in illustrating the operation of the device of FIG. 1.

Describing generally how device 12 operates, and considering FIG. 2 along with FIG. 1, when a pulse, like that shown schematically at 24, is supplied to drive conductor 20 with sufficient energy to create a field greater than the anisotropy field in the film, this pulse rotates the magnetization in the film 90-degrees from the easy-axis to the hard-axis direction. Upon abrupt termination of pulse 24, and in the absence of any external applied field (i.e. with surface 10 either being absent or nonmagnetized), two or more domains will be established in the film, with the magnetic vectors in each domain rotating in opposite directions to one or the other direction of the easy-axis orientation. As a consequence, this tends to minimize the total magnetic energy—leaving film 14 as a whole with very little net magnetization. This action is illustrated in FIG. 2, with vector 26 indicating hard-axis magnetization during the presence of pulse 24, and with tiny vector 28 representing the minor net magnetization resulting along the easy axis after removal of pulse 24.

However, where the same kind of drive pulse is applied in the presence of a small stray field which has components extending generally in the direction of easy axis 16, such a stray field being illustrated generally at 30 in FIG. 1, that field, with termination of the drive pulse and collapse of the hard-axis magnetization, will exert a torque on the electron spins in film 14. This torque will favor rotation in the direction of the applied field, thus resulting in a partial magnetization of the film. Such a partial magnetization is illustrated by vector 32 in FIG. 2. The dashed vector lines in FIG. 2 which exist between vectors 26, 32 represent the kind of torqued rotation which occurs in the direction from vector 26 towards vector 32 with collapse of the drive pulse. The dashed vector lines which extend below vector 26 in FIG. 2 illustrate the torqued rotation which would have occurred had the stray field possessed a polarity opposite that which produced vector 32.

The degree to which film 14 as a whole may be magnetized in one easy-axis direction or the other (the limit being saturation magnetization of the material) by an applied field of given strength depends upon (1) the anisotropy dispersion, i.e. the variation of orientation of the easy axis of magnetization throughout the film, (2) the uniformity of orientation of the applied field, and (3) the magnitude of demagnetizing fields within the film. The latter is determined by the geometry and magnetic properties of the magnetic film, and by the degree to which easy-axis flux closure is facilitated by a low-reluctance flux path in the external magnetic circuit. The extent of easy-axis dispersion is determined by the composition of the film, and by the conditions under which the film is created.

Thus, under the influence of a suitable stray field, such as field 30, from the recording surface in a magnetic medium, such as surface 10, and upon termination of a drive pulse, such as pulse 24, the magnetization in film 14 will abruptly change from a saturated state in a hard-axis direction to some non-zero state of magnetization in an easy-axis direction. This easy-axis direction will parallel and be the same as that associated with the stray activating field. The flux which links conductor 22 thus rapidly increases from a near zero level to a relatively high level, thereby generating a short-duration EMF in conductor 22. Upon reinstating the hard-axis energizing field, a similar pulse of opposite polarity is generated. Thus, the Bittmann-type sensor produces a signal only upon command, in a manner similar to that described for the flux-gate-type transducer presented in my previously cited patent. Such transducers may be referred to as "active" devices, while those requiring no external excitation, as for example conventional inductive heads, may be classed as "passive" devices.

Continuing attention on FIG. 1, it is apparent that a device of the type thus shown provides no means to facilitate flux closure in either the easy or hard-axis orientations of film 14. Accordingly, a Bittmann-type device may be referred to as an "open-flux, cross-field" transducer. This being the case, demagnetizing fields in both axes are dependent solely on film geometry. In particular, such fields depend on there being a ratio of film width and length to film thickness which is quite large (on the order of about 2,000-to-1 or greater). In practice, this condition limits the minimum length of the film along the easy axis to a relatively large value which, in turn, severely limits the track and/or bit densities achievable with such a transducer. Also, the condition requires a large hard-axis energizing current (1- ampere in the example set forth in the Bittmann patent), and results in large and undesirable stray fields. Moreover, it is apparent in FIG. 1 that the stray field from the recording medium, which acts to steer the magnetization in layer 14 toward the appropriate easy-axis direction, is effectively coupled only to the region of layer 14 that is closest to the medium, thus limiting the sensitivity of the transducer to stray fields from the medium.

Figure 3:
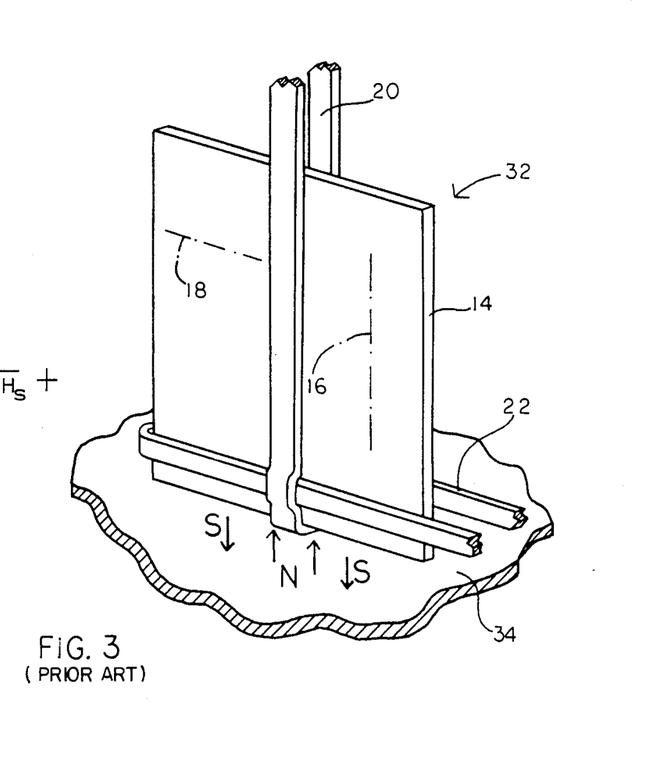
FIG. 3, which is like FIG. 1, shows an alternative Bittmann-type transducer.

FIG. 3 illustrates an alternative structure for a Bittmann-type device. Components in this device which perform the same functions as like components in the device of FIG. 1 have been given the same reference numbers.

Here there is shown a transducer 32 which is intended for handling information recorded vertically on the recording surface 34 in a magnetic disk. One should note that the easy axis 16 of magnetization and the hard axis 18 are rotated 90-degrees from the positions which they occupied in the device of FIG. 1. Also, conductors 20, 22 have been correspondingly rotated.

The practical utility of this kind of a device, however, is even more questionable than that of the device shown in FIG. 1. A field presented by surface 34, as shown by the arrows positioned beneath device 32, would steer the magnetization in film 14 in opposite directions in different regions of the film, thus producing relatively little EMF in conductor 22 For the device of FIG. 3 to be effective in sensing fields perpendicular to the plane of surface 34, it would be necessary that such fields be uniformly oriented so that they would tend to steer the magnetization in film 14 everywhere in the same direction. In addition, and as is true with regard to the device of FIG. 1, it would be desirable, if not necessary, to reduce the de-magnetizing fields along the easy axis in film 14, and to increase the effective magnetic coupling between the film and surface 34.

Figure 4:
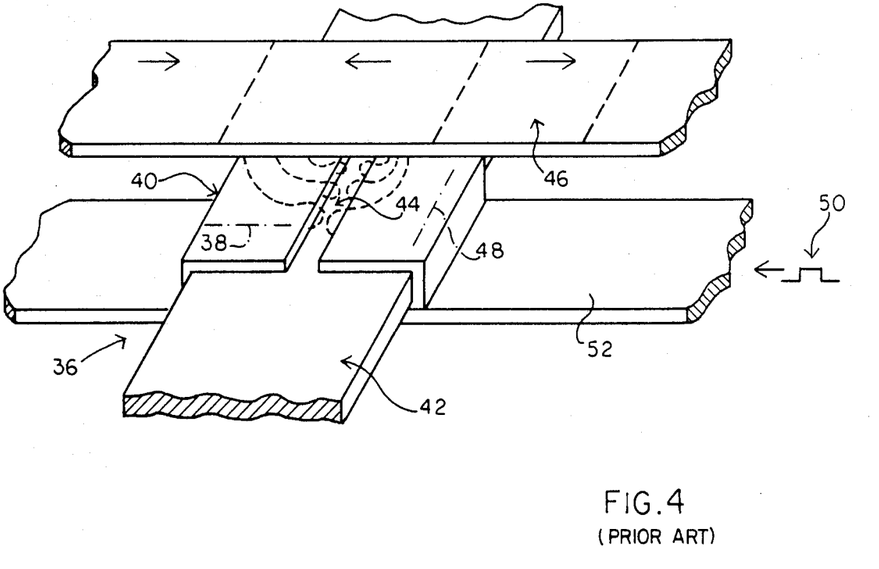
FIG. 4 is a fragmentary, simplified, perspective view illustrating a transducer of the type mentioned above as described by Kaske et al.

Turning attention now briefly to FIG. 4, here there is illustrated a cross-field-type transducer 36 of the kind disclosed by Kaske et al, designed to sense remanant flux in longitudinally oriented media. Like the Bittman sensor, transducer 36 is an "active" device. This transducer has a significant advantage over the Bittmann-type transducers in that it provides a substantially closed flux path in the easy axis (dash-dot line 38) of magnetization of thin magnetic film 40, which effectively wraps around sense conductor 42 except for a narrow gap 44. This structural situation minimizes demagnetizing fields, and increases output signal amplitude and sensitivity to fields produced by a magnetic recording medium, such as tape 46.

However, the energizing (hard-axis 48) field produced by a current pulse, such as pulse 50, in a drive conductor, such as conductor 52, is established in an open-flux magnetic circuit which requires large drive current (again on the order of 1 ampere) and produces large stray fields as in the Bittmann-type transducers. Because of this, device 36 may be referred to as a "semi-closed-flux, cross-field" transducer.

The structure of a transducer like transducer 36 introduces a number of fabrication problems. The narrower is gap 44 in film 40, the more difficult it is to form the gap and to control its width—thus making the fabricating of such transducers for use in high-density recording very difficult. Also, some means of filling the gap is desirable to prevent the accumulation of magnetic debris from shunting and distorting the gap geometry. Another problem of practical concern lies in the fact that film 40 is extremely thin and highly vulnerable to abrasion. In addition, the design does not lend itself to construction of closely spaced arrays of individually addressable transducers.

DETAILED DESCRIPTION OF THE INVENTION

Figure 5:
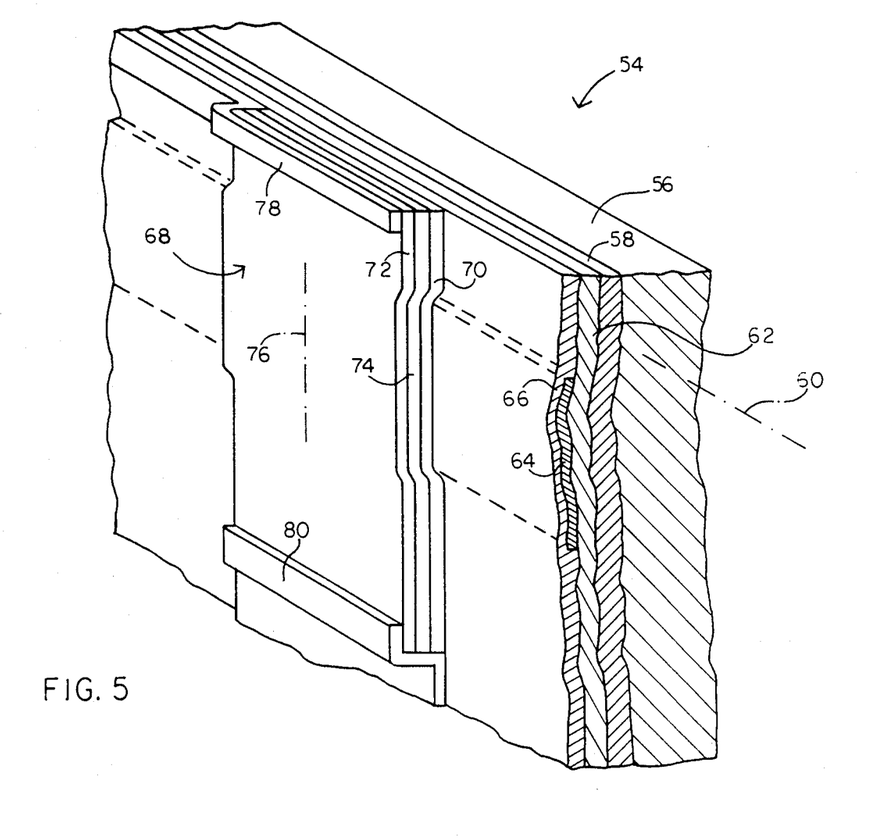
FIG. 5 is a fragmentary perspective view illustrating a preferred embodiment of a single-head structure proposed by the present invention.
Figure 6:
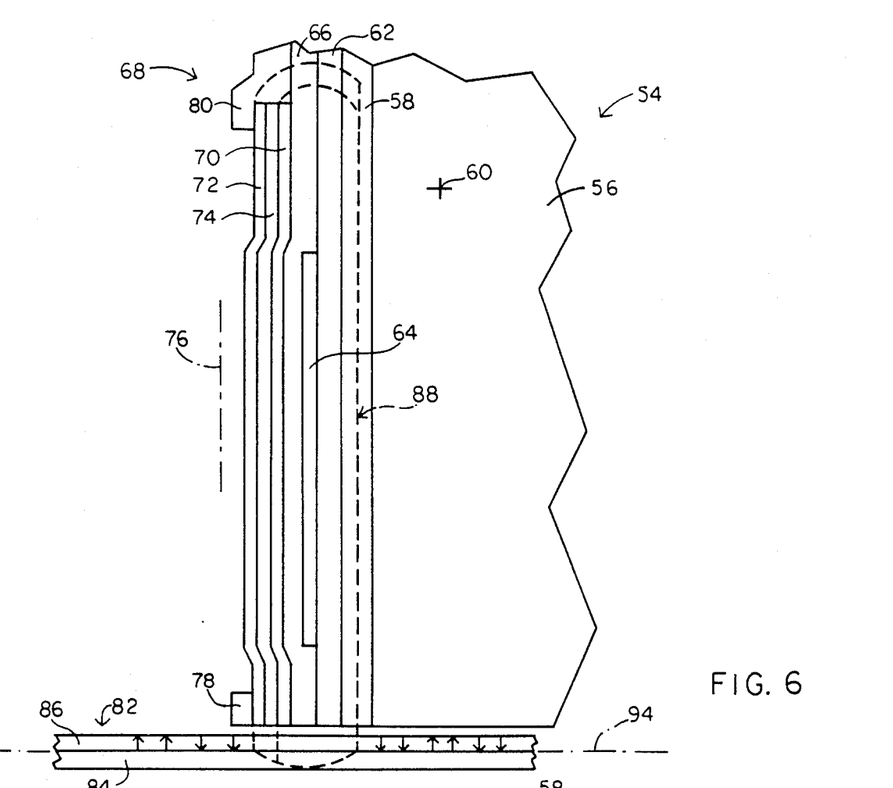
FIG. 6 is a fragmentary side view further illustrating the structure of FIG. 5 under a condition where it is being employed with a perpendicularly oriented recording medium.

In FIGS. 5 and 6, a preferred embodiment of the invention is shown which contains all of the key elements that lead to overcoming the various disadvantages and drawbacks of the prior art devices. In both figures, a single head, or transducer, or field device, is shown—with FIG. 5 illustrating the head structure fragmentarily and with what may be thought of as its working surface facing upwardly in the figure, and with FIG. 6 showing the head with its working surface at the base of the figure confronting a perpendicularly oriented magnetic recording medium.

The basic structure of the head, which is designated generally at 54, is probably best understood from a study of FIG. 5. Included in the head structure is a suitable smooth-surfaced rigid support substrate 56, on the near side of which in FIG. 5 there is uniformly deposited, a thin, preferably isotropic, high-permeability magnetic film 58. Alternately, film 58 may be anisotropic, with its easy axis of magnetization extending generally in the direction of dash-dot line 60. Deposited over film 56 is a thin layer 62 of a suitable electrical insulating material, such as aluminum oxide.

Formed on layer 62, somewhat below the top surface of the structure in FIG. 5, is an elongate conductor 64, over which there is deposited a second electrical insulating layer 66. The upper surfaces in FIG. 5 of substrate 56, film 58, layer 62, and layer 66 are coplanar and partially define the working edge or surface of head 54. Conductor 64 herein extends in a path which is substantially parallel with this working edge. Conductor 64 functions herein as a record/sense conductor.

Also forming part of head 54 is a main pole structure 68 which includes a pair of thin, anisotropic, high-permeability magnetic layers 70, 72 that are separated by a thin, high-conductivity layer, or conductor, 74 to form a sandwich-like structure lying against layer 66. Layers 70, 72 cover all but the two lateral edges of layer 74. The upper edges of layers 70, 72, 74 in FIG. 5 are coplanar with what was referred to earlier as the working edge of head 54.

Collectively, magnetic film 58 and magnetic layers 70, 72 are referred to as magnetically permeable coupling means, with film 58 being referred to as one portion of that coupling means and layers 70, 72 forming another portion of the coupling means. These portions couple with conductors 64, 74. Conductor 64 and conductive layer 74 are orthogonal relative to one another. The easy axis of layers 70, 72 are parallel and extend with the orientation shown by dash-dot line 76.

Preferably, magnetic layers 70, 72 are formed with a thickness of 0.2-micrometers or less in order to prevent the formation of domains with easy magnetization axes normal to the planes of these layers. Such thin layers or films, which are often referred to as "single domain" films, have low demagnetizing fields, and therefore exhibit square-loop hysteresis properties.

Completing a description of head 54, the same further includes conductors 78, 80 which make electrical contact with the extremities (upper and lower in FIG. 5) of main pole 68, thus enabling the passage of current through the main pole along a path which parallels axis 76. Due to the high conductivity of layer 74 and the low conductivities of layers 70, 72, substantially all of such current passes through layer 74.

Conductor 64, shown as a single-turn conductor, could also be fabricated in the form of a multi-turn winding.

As was mentioned earlier, in FIG. 6 head 54 is shown in an operative position disposed slightly above a perpendicularly oriented magnetic recording medium—the latter being shown generally at 82 in this figure. Thus, easy axis 76, which is also referred to herein as a medium-coupling axis, is disposed substantially normal to the recording surface of medium 82. This situation produces what I call herein operative coupling alignment.

Considering how head 54 functions during a sensing or reading operation, current through conductor 74 in main pole 68 produces a magnetic field which causes the magnetization in layers 70, 72 to rotate from the easy axis to the hard axis. The sandwich structure of main pole 68, as shown in FIGS. 5 and 6, provides almost complete flux closure in the hard-axis direction, inasmuch as only the two thin lateral edges of conductor 74 define thin gaps between layers 70, 72. Looking at this organization along axis 76, the perimeter of the cross section of conductor 74 is seen to be almost completely surrounded by that portion of the magnetic coupling means formed by layers 70, 72. As a consequence of this structural situation, it is possible with head 54 to obtain an effective field intensity in excess of the anisotropic field of layers 70, 72 with low applied current (on the order of about 20-milliamperes). The significance of the substantially completely closed flux path in the hard-axis direction becomes most apparent as the width of main pole 68, and therefore the track width, is made small, for example, on the order of about 10-micrometers or less. In the absence of such a closed flux structure, very large demagnetizing fields would be created in the hard-axis direction, and this would require extremely large energizing current in order to overcome such fields. Further, the low current and closed flux path provided by the sandwich structure of pole 68 minimize heat dissipation and deleterious stray fields.

When the current flow through the main pole is rapidly terminated, any perpendicularly oriented stray field in an adjacent medium, like disk 82, steers the magnetization in layers 70, 72 to the easy axis-direction which corresponds to the orientation of the remanant magnetization in the storage surface of the disk. As a consequence of this, the flux linking sense conductor 64 rapidly increases from zero to a value nearly equal to the product of the saturation flux density characteristic of the magnetic material, and the total cross-sectional areas of layers 70, 72. This, in turn, generates a very high-amplitude, short-duration EMF in conductor 64, the polarity of which is determined by the polarity of the remanant magnetization in the medium When current flow is again established in conductor 74, flux which links sense conductor 64 rapidly decreases to a very low level, and a similar EMF of opposite polarity is generated. Thus, head 54 is an "active" device.

Figure 7:
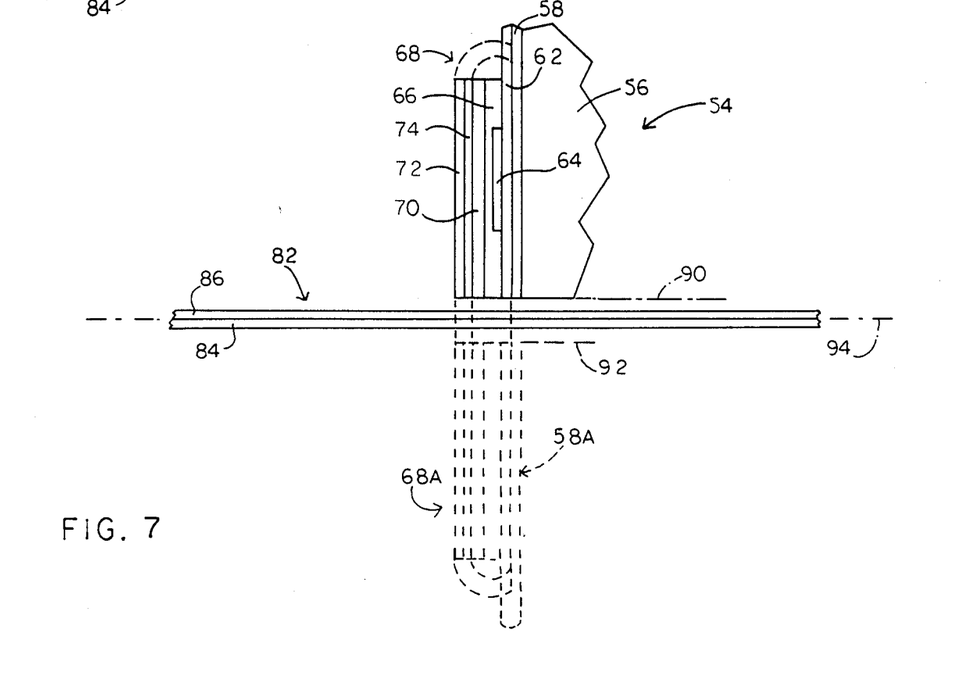
FIG. 7, which is a highly simplified fragmentary view of the same device shown in FIG. 6, illustrates the performance of this device with a perpendicularly oriented medium.

Considering for a moment the magnetic structure of disk 82, and how the same interacts in a special way with head 68 because of the construction of the latter, and referring now to FIG. 7 along with FIG. 6, the disk includes a double-layer medium including a high-permeability underlayer 84 and an upper storage layer 86.

The principal magnetic circuit which links head 54 with the medium's high-permeability underlayer is illustrated by the dashed lines shown at 88 in FIG. 6. With suitable separation of main pole 68 and magnetic film 58, which is also referred to herein as an image plane, (such separation being an order of magnitude greater than head/medium separation), the field produced at the tip or working edge of the main pole is substantially perpendicular to the plane of storage layer 86. Addressing attention now particularly to FIG. 7, underlayer 84 serves as an image plane, creating in effect an image 68A of main pole 68, as well as an image 58A of film 58, below underlayer 84. The plane 90 of the working edge of head 54, and the plane 92 of the mirror image of this edge, are disposed symetrically with respect to the plane 94 of the interface between underlayer 84 and upper storage layer 86. Thus, the interaction of image plane 58 and underlayer 84 gives rise to a low-reluctance magnetic circuit which includes an elemental volume of storage layer 86. Because of this, demagnetizing fields in the main pole are greatly minimized, and the signal amplitude and sensitivity to fields produced by the medium are maximized. Accordingly, head 54, in cooperative relationship with the recording medium described, provides closed flux paths in both of the cross-field axes, and accordingly can be referred to as a "closed-flux, cross-field" transducer.

Figure 8:
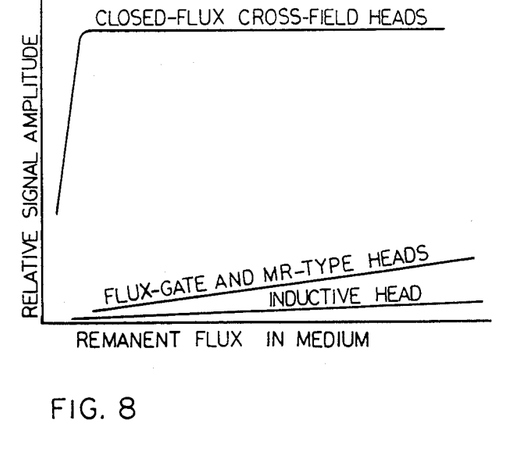
FIGS. 8 and 9 show, graphically, the sensitivity functions of closed-flux, cross-field devices as compared with those of conventional inductive heads and of fluxgate and magnetoresistive-type heads.
Figure 9:
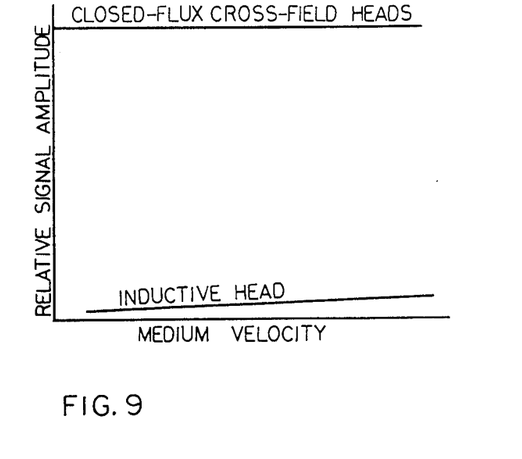

The sensitivity function of a closed-flux, cross-field transducer is shown in FIGS. 8 and 9, along with the same for conventional inductive heads and for flux-sensitive and magnetoresistive (MR)-type transducers. In FIG. 8, it can be seen that the maximum signal amplitude obtainable from the closed-flux cross-field transducer is typically one to two orders of magnitude greater than that for conventional inductive heads, and that for applied fields greater than that necessary to overcome easy-axis dispersion, the signal amplitude is independent of the strength of the applied field (stray field from a medium). Thus, the transducer of FIG. 5 appears to function as a flux amplifier whose output saturates in the presence of a relatively small applied field—the result being that the transducer may be employed as a digital phase-sensitive mechanism with very extraordinary signal-noise characteristics rather than as an analog device. FIG. 9 shows that the signal amplitude of the closed-flux cross-field transducer is independent of the motion of the medium, as is the case with flux-sensitive type transducers, e.g., flux-gate and magneto-resistive sensors, and, unlike that of conventional inductive heads whose output is linearly related to medium velocity.

The flux-amplification capability of the transducer of FIG. 5 can also be employed during a recording operation, during which a high-intensity field and a large field gradient at the main pole writing tip can be produced with the application of a relatively small magnetomotive force During a recording operation, magnetization in main pole 68 is first rotated from the easy axis to a saturated state in the hard axis by passing a suitable energizing current through conductor 74. At this point in time, let us assume that there is no magnetic image, and hence no stray field, in the storage layer of disk 82, and more particularly in that portion of the storage layer which lies directly underneath main pole 68. Next, a current is passed through conductor 64. Thereafter, when the energizing current through conductor 74 is abruptly terminated, the field produced by current through conductor 64 steers the magnetization into one or the other orientation of the easy axis, as desired. The steering field produced by the applied current in conductor 64, necessary to cause the main pole to saturate in an easy-axis direction, need only be that which is required to overcome dispersion of the easy axis (typically on the order of 0.1-oersted) and demagnetizing fields in the main pole.

With regard to demagnetizing fields in the main pole, the principal contributor is any field produced by the storage layer in the adjacent medium before magnetization reversal takes place. This, of course, is a function of the remanant magnetization in the medium. Typically, the demagnetizing field produced in main pole 68 by media may be on the order of 1-oersted. Consequently, only a small applied magnetomotive force on about the order of 30milliampere-turns is required to produce a field intensity at the pole tip nearly equal to the saturation flux density of the magnetic material making up main pole 68. The energy needed to reverse the magnetization in the medium is supplied principally by the anisotropy energy of the main pole, and not by the applied magnetomotive force.

Recording may be accomplishd alternatively with head 54 simply by applying a steady hard-axis drive current, and by switching the polarity of current applied to the record/sense winding in a manner similar to that used in conventional recording practice. It should be noted, however, that no flux amplification is possible in this mode of operation and that somewhat larger applied magnetomotive force is required.

The "single domain" character of films 70, 72 plays an important role not only in minimizing demagnetizing fields, as was mentioned earlier, but also in reducing side-fringing fields at the main pole tip. This situation increases the field gradient at the pole tip, and enables the writing of narrower flux transitions in a medium and the realization of higher resolution during a reading procedure.

Figures 10, 11, 12:
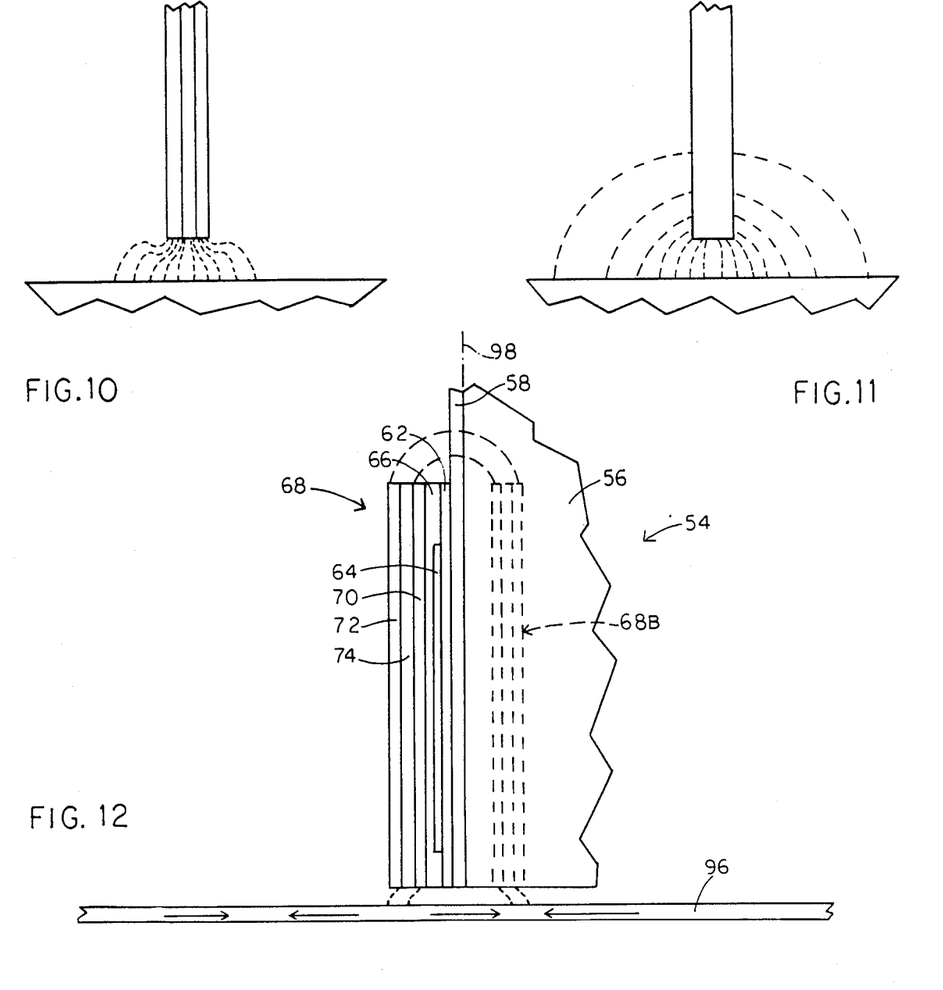
FIGS. 10 and 11 are simplified schematic drawings which comparatively illustrate how the structure of the present invention, vis-a-vis prior art structures, minimizes unwanted fringing fields.
FIG. 12 is a simplified view, somewhat like FIGS. 6 and 7, illustrating the device of FIG. 5 employed with a longitudinally oriented recording medium.

Directing attention for a moment to FIGS. 10 and 11, in the absence of surface charges on the sides of the main pole tip, the field distribution has the form generally illustrated in FIG. 10. Comparing this field distribution with that shown in FIG. 11, in which surface charges exist on the sides of the pole tip, it will be seen that both a higher field intensity and field gradient are obtained with the absence of such surface charges.

While the transducer of FIG. 5 is optimally configured to record and read flux transitions in a perpendicularly-oriented storage layer lying over a soft magnetic underlayer, as shown in FIG. 6, the same kind of transducer may be used to advantage to record and read flux reversals in single-layer, longitudinally-oriented media, such as the one illustrated at 96 in FIG. 12. In this circumstance, film 58 functions as an image plane which serves, in effect, to create a second main pole 68B spaced symetrically relative to main pole 68 on the opposite side of film 58. There is thus an effective configuration similar in appearance to that of a thin-film ring-type head having a gap equal to the distance between pole 68 and phantom pole 68B.

However, the operation of the transducer in both read and write functions departs radically from that of the conventional inductive ring-type head, and in particular, is similar to the operation already described for the case of perpendicular recording using a two-layer medium. Here it is the longitudinal, or in-plane, component of the field generated at the tip of pole 68 which is used principally to magnetize a medium, and it is the stray field from the residual magnetization in the medium that causes the magnetization in the main pole to rotate to one or the other easy-axis orientation upon the removal of the hard-axis energizing field.

Figures 13, 14:
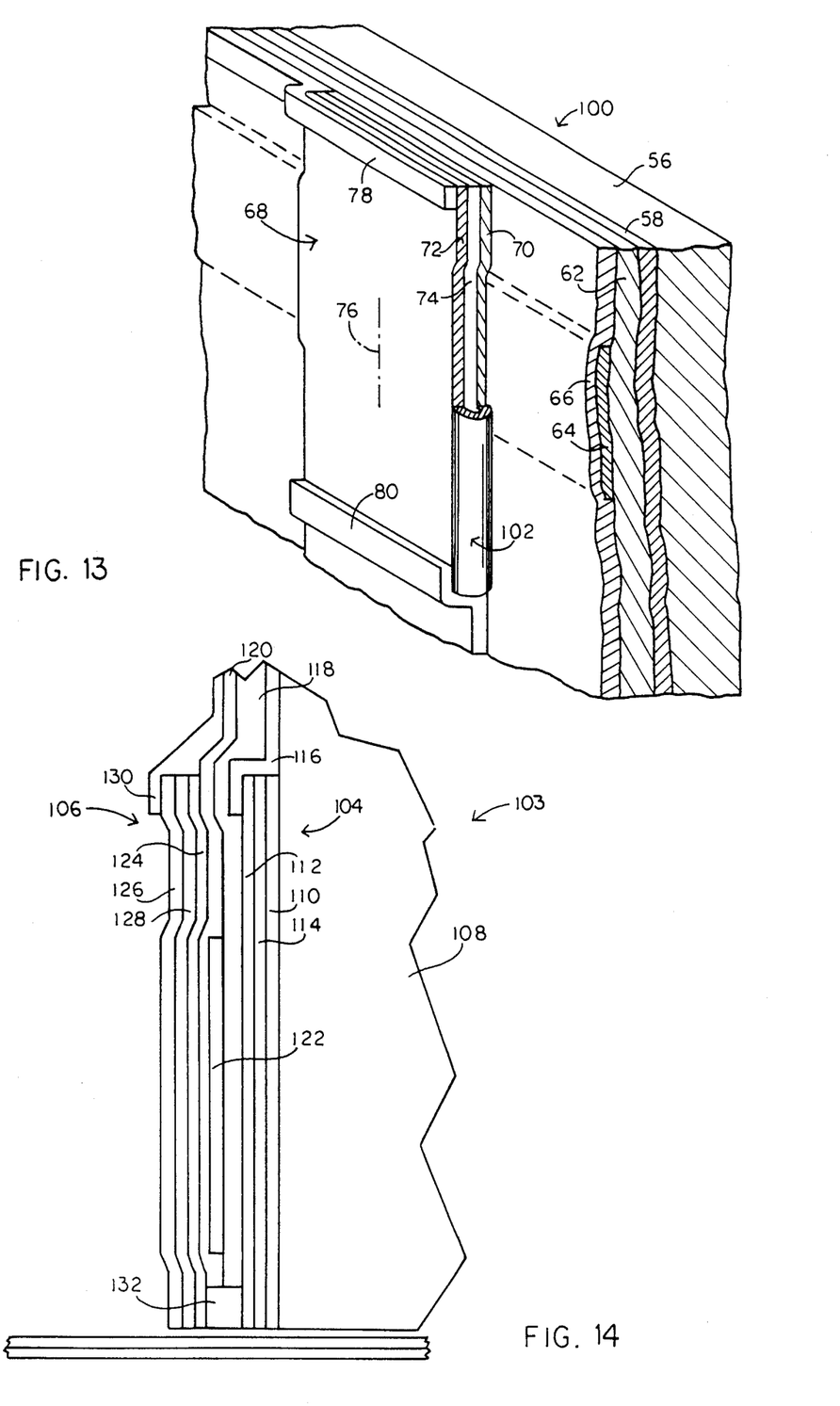
FIG. 13 shows a device which is nearly the same as that shown in FIG. 5, with the exception that, in the device of FIG. 13, certain jacketing magnetic structure completely closes around the edges of its internally associated conductor.
FIG. 14 is a view similar to that taken in FIG. 6, showing a double-layer modification of the device of FIG. 6 especially designed for use in conjunction with longitudinally oriented recording media.

With reference now to FIG. 13, here there is shown at 100 a slightly modified version of the head shown in FIG. 5. Elements of head 100 which directly correspond with like elements in head 54 have been given the same reference numbers. The only difference between head 100 and head 54 is that, along opposite lateral edges of conductor 74 in main pole 68, magnetic bridges, such as bridge 102, magnetically interconnect layers 70, 72. Thus, the portion of the magnetic coupling means formed by layers 70, 72 can be thought of as extending in an ungapped manner about the perimeter of the cross section of conductor 74. Bridges 102 are formed of the same magnetic material as is used in layers 70, 72.

FIG. 14 shows an alternative head configuration intended for use with longitudinally-oriented media. In general terms, this head, shown at 103, includes two sandwich-construction poles which are like previously described main pole 68 in transducer 54. These two poles are shown generally at 104, 106.

Describing the construction of head 103 more specifically, the same includes a rigid support substrate 108 against which pole 104 directly lies. Pole 104 includes spaced thin-film magnetic layers 110, 112 disposed in sandwich fashion on opposite sides of a thin-film conductive layer, or conductor, 114. Layers 110, 112 are formed of substantially the same material as that used to form previously described layers 70, 72. Coupling conductively with the top of pole 104 is a conductor 116 which is like previously mentioned conductor 80. Progressing to the left in FIG. 14 from the structure just described are two insulating layers 118, 120 inside of which is embedded a conductor 122 which is shared by poles 104, 106. Conductor 122 corresonds to record-/sense conductor 64.

Continuing to the left through head structure 103, pole 106 includes inner and outer thin-film magnetic layers 124, 126, respectively, sandwiched on opposite sides of a thin-film conductive layer, or conductor, 128. Conductively connected to the top of pole 106 is a conductor 130 which corresponds to conductor 116 for pole 104. Conductively coupled in a shared sense to the bottom ends of poles 104, 106 is a conductor 132 which corresponds to previously described conductor 78. Conductors 114, 128 are also referred to herein as runs.

The operation of head 103 in both recording and reading modes is similar to the operation described earlier for the single-pole head of FIG. 5, except that the hard-axis energizing current is made to flow simultaneously through both poles 104, 106. Each of these poles, of course, is coupled inductively to record/sense conductor 122.

Figure 15:
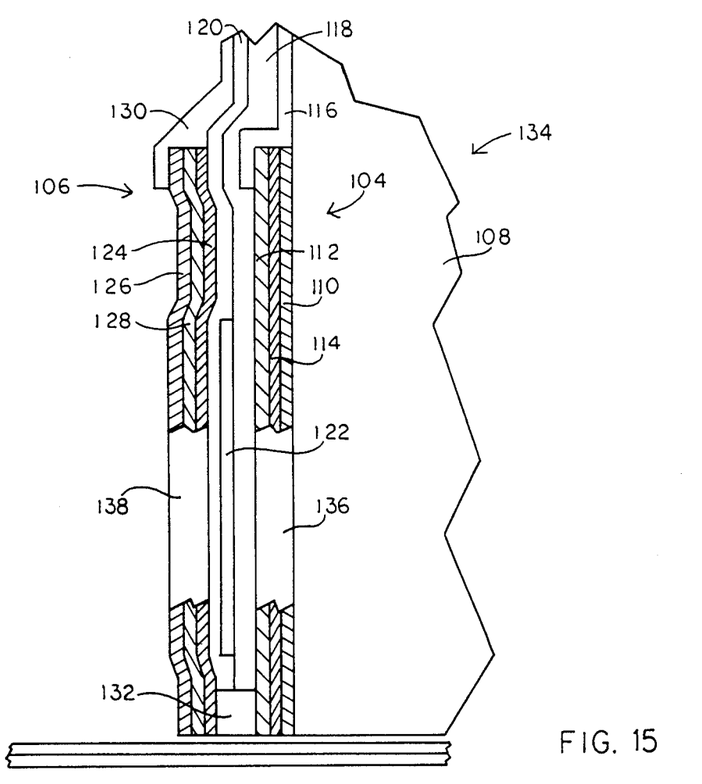
FIG. 15 shows a device like that illustrated in FIG. 14 modified to include a structure wherein jacketing magnetic portions completely cover the lateral edges of associated internal conductors.

Head 103, with respect to the constructions of pole 104, 106 is like head 54 with regard to the construction of pole 68, in the sense that layers 110, 112 and layers 124, 126 do not connect magnetically around the lateral edges of conductors 114, 128, respectively. FIG. 15 shows a dual-pole head 134 which is like head 103 in every respect except that these magnetic layers do couple around the lateral edges of conductors 114, 128 through bridges, such as those shown at 136, 138, respectively. In this regard, poles 104, 106 are like pole 68 in head 100 shown in FIG. 13. One should understand that the two bridges illustrated in FIG. 15 have been shown partially broken away in order to reveal the internal structures of poles 104, 106.

Head 134 performs substantially the same as head 103.

Figure 16:
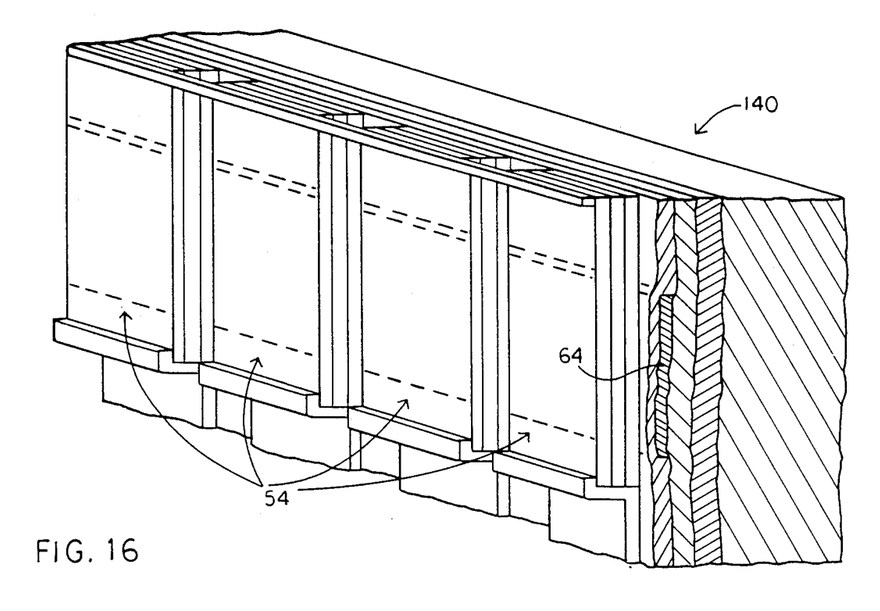
FIG. 16 shows a linear array of devices like the one device depicted in FIG. 5.
Figure 17:
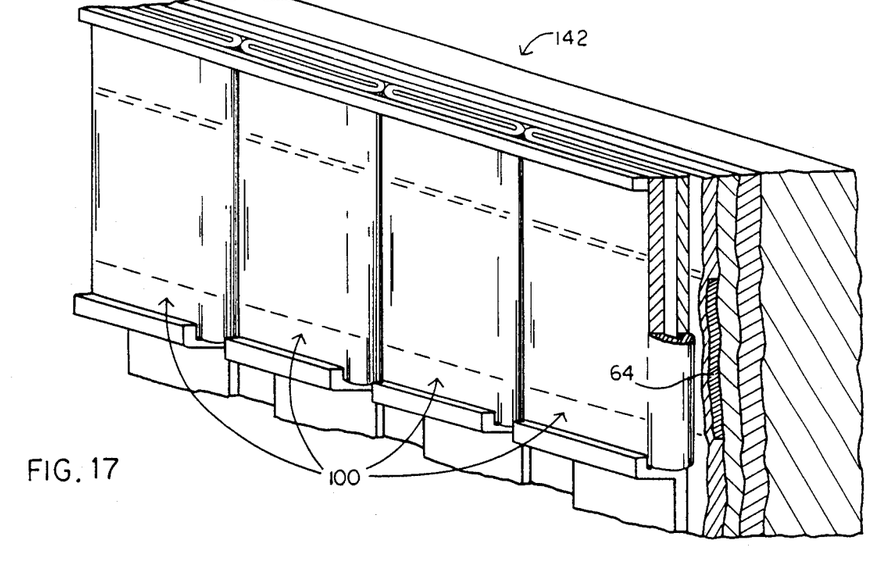
FIG. 17 shows a linear array of devices like the one device shown in FIG. 13.

Each of the head constructions described so far herein can readily be fabricated in closed-packed, multi-track arrays. Shown in fragmentary perspective views in FIGS. 16 and 17, at 140, 142, respectively, are multiple-head arrays based on the structures of heads 54, 100, respectively. Detailed descriptions of the internal structures of the individual heads in each array are omitted in order to avoid unnecessary repetition. It should be pointed out, however, that record/sense conductor in each of these arrays is now shared by all of the heads in the arrays.

Figure 18:
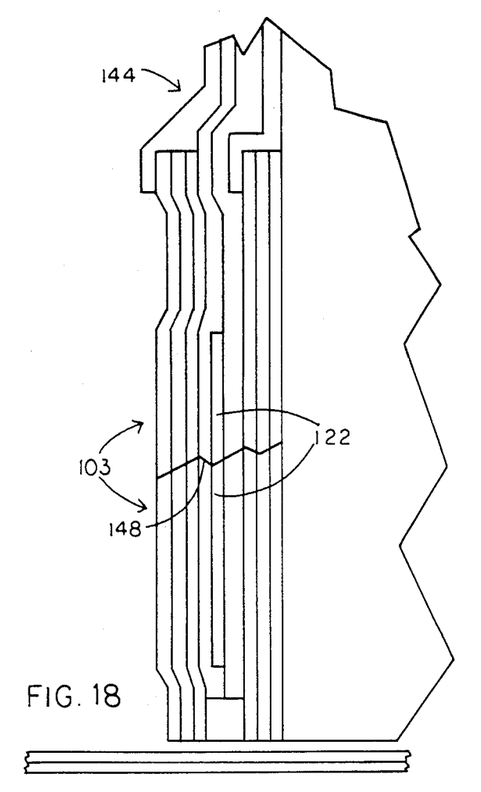
FIG. 18 is a view taken substantially from the same point of view as FIG. 14, illustrating a linear array of plural devices like the one depicted in FIG. 14.
Figure 19:
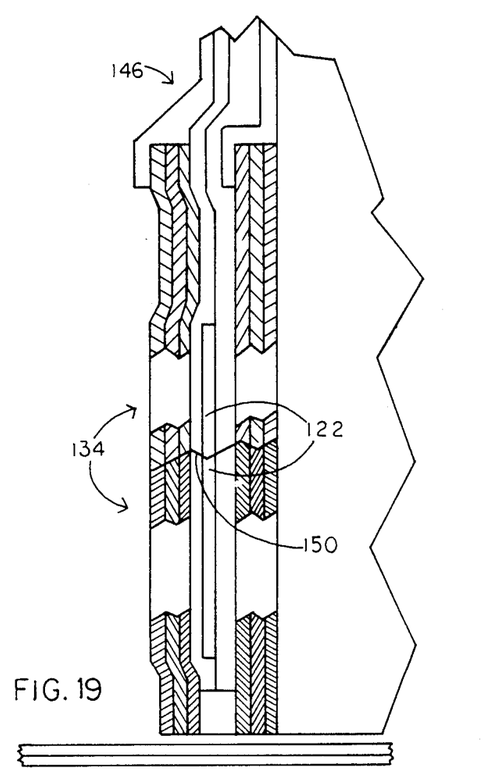
FIG. 19 shows a linear array of devices like the one device shown in FIG. 15.

FIGS. 18 and 19, which are views like those taken in FIGS. 14 and 15, respectively, disclose multiple-head arrays including heads like heads 103, 134, respectively. Jagged line 148 in FIG. 18 indicates a fragmentation in the depicted structure in order to show a pair of heads 103, with one being behind the other (from the point of view taken in the figure). The same is true with regard to jagged line 150 in FIG. 19. In the multiple-head array shown in FIGS. 18 and 19, record/sense conductors 122 are shared by all heads in the arrays.

With each of the head arrays just described, writing on a selected track is accomplished by first passing a DC current through all of the poles in an array sufficient to drive each pole into hard-axis saturation. Current is then passed through the commonly shared record/sense conductor in a direction corresponding to the desired polarity, and at the appropriate time, current flow through selected poles is abruptly terminated. This enables the field generated by current in the record-/sense winding to reverse magnetization polarity in the associated medium as it passes under the selected poles.

Since it is necessary only to apply a magnetomotive force sufficient to overcome the demagnetizing fields in a pole tip, produced by the medium, in order to saturate the pole in the desired easy-axis orientation, a significant amplification of magnetomotive force is realized. The energy to switch the magnetization in the medium derives principally from the anisotropy energy in the pole. This condition does not prevail in the non-addressed poles, since the magnetization in these poles remains biased in the hard-axis direction, and the magnetomotive force produced by the current flowing in the sense winding is well below that required to alter the magnetization state of the medium. Thus, it is the flux or magnetomotive force amplification property of the transducer which enables writing only on selected tracks in multielement arrays.

During a reading operation, particular tracks are addressed simply by driving the appropriate associated poles into hard-axis saturation at the proper times, and by then collapsing this condition to alloW the stray field in the medium to switch the poles to the appropriate easy-axis orientation.

It should thus be apparent how the invention, in all of its various embodiments disclosed herein, amply meets the objectives set forth for it above. The various structures shown and described herein clearly overcome the principal disadvantages of prior art devices, in ways which provide very significant performance improvements.

While a preferred embodiment, and several modifications, of the invention have been described herein, it is appreciated that variations and modifications may be made without departing from the spirit of the invention.

It is claimed and desired to secure by Letters Patent:

1. A dual-closed-flux, cross-field, anisotropic, electromagnetic field device for use with a magnetic recording medium having a recording surface, said device comprising
    a pair of othrogonally related current conductors each including a defined current-conduction axis, and
    magnetically permeable structure including portions coupled inductively to each of said conductors,
    one of said portions extending at least substantially completely around the cross-sectional perimeter of one of said conductors relative to its said defined current-conduction axis, with an easy, medium-coupling axis of magnetization which substantially parallels such current flow, said one portion being structured in such a manner that, with the device in use with such a recording surface, said easy axis will be disposed substantially normal to such surface.

2. The device of claim 1, wherein said one portion extends ungapped around the cross-sectional perimeter of said one conductor.

3. The device of claim 1, wherein said one conductor has a planar structure with opposed faces terminating in edges that substantially parallel said easy axis, and said one portion includes a pair of spaced, planar expanses distributed over, and substantially coextensive with, said faces.

4. The device of claim 1, wherein said one conductor includes a pair of spaced, substantially parallel, series-connected runs disposed on opposite sides of the other conductor.

5. The device of claim 4, wherein said one portion includes regions extending ungapped around the cross-sectional perimeter of each of said runs.

6. The device of claim 4, wherein each run has a planar structure with opposed faces terminating in edges that substantially parallel said easy axis, and said one portion, for each run, includes a pair of spaced, planar expanses distributed over, and substantially coextensive with, the faces in the associated run.

7. A thin-film, dual-closed-flux cross-field, flux-amplifying, electromagnetic transducer for writing images on, and reading images from, a magnetic image-storage medium, said transducer comprising
orthogonally related drive-current and read/write current conductors, each including a defined current-conduction axis, and
magetic pole structure inductively coupled to said conductors,
said pole structure, as related to said drive-current conductor, including a portion substantially completely surrounding said drive-current conductor with respect to its said defined current-conduction axis, with said portion having an easy axis of magnetization which substantially parallels said current-conduction axis.

8. The transducer of claim 7, wherein said drive-current conductor has a planar structure with opposed faces terminating in edges that substantially parallel said easy axis, and said portion includes a pair of spaced, planar expanes distributed over, and substantially coextensive with, said faces.

9. The transducer of claim 7, wherein said drive-current conductor includes a pair of spaced, substantially parallel, series-connected runs disposed on opposite sides of said read/write-current conductor.

10. The transducer of claim 9, wherein each run has a planar structure with opposed faces terminating in edges that substantially parallel said easy axis, and said portion, for each run, includes a pair of spaced, planar expanses distibuted over, and sustantially coextensive with, the faces in the associated run.

11. A thin-film, flux-amplifying, electromagnetic transducer for writing images on, and reading images from a magnetic image-storage medium, said transducer comprising
an elongate drive-conductor having a defined drive-current axis,
main-pole magnetic structure inductively coupled to and substantially completely surrounding said drive-conductor along at least a portion of its length, said structure defining a substantially closed flux path extending around the drive-conductor with an easy axis of magetization which is substantially parallel to said drive-current axis,
secondary-pole magnetic closure structure including an expanse spaced from said first-mentioned structue, and
an elongate read/write-conductor inductively coupled both to said first-mentioned structure and to said closure structure, said read/write conductor having a defined read/write-current axis, and extending in the space between said first-mentioned structure and said closure structure with said read/write-current axis being substantially orthogonal relative to said drive-current axis.

12. A unitary, multi-track, dual-closed-flux, cross-field, anisotropic electromagnetic field structure for use with a magnetic recording medium having a recording surface, where the devices in the structure are disposed in side-by-side adjacency, said structure comprising, for each device,
a pair of orthogonally related current conductors each including a defined current-conduction axis, and
magnetically permeable structue, including portions coupled inductively to each of said conductors,
one of said portions extending at least substantially completely around the cross-sectional perimeter of one of said conductors relative to its said current-conduction axis, with an easy, medium-coupling axis of magnetization which substantially parallels said current-conduction axis, said one portion being structured in such a manner that, with the device in use with such a recording surface, said easy axis will be disposed substantially normal to such surface.

13. The structure of claim 12, wherein said one portion extends ungapped around the cross-sectional perimeter of its associated said one conductor.

14. The structure of claim 12, wherein, for each device, said one conductor has a planar structure with opposed faces terminating in edges that substantially parallel said easy axis, and said one portion includes a pair of spaced, planar expanses distributed over, and substantially coextensive with, said faces.

15. The structure of claim 12, wherein, for each device, said one conductor includes a pair of spaced, substantially parallel, series-connected runs disposed on opposite sides of the other conductor.

16. The struture of claim 15, wherein, for each device, said one portion includes regions extending ungapped around the cross-sectional perimeter of each of said runs.

17. The structure of claim 15, wherein, for each device, each run has a planar structure with opposed faces terminating in edges that substantially parallel said easy axis, and said one portion, for each run, includes a pair of spaced, planar expanses distributed over, and substantially coextensive with, the faces in the associated run.

18. The structure of claims 12, 13, 14, 15, 16 or 17, wherein the other conductors in said devices are connected in series to form a unitary conductive path which is common to all of the devices.

19. A thin-film, dual-closed-flux, cross-field, flux-amplifying, electomagnetic transducer structure for writing images on, and reading images from, a magnetic image-storage medium, said structure comprising
plural, orthogonally related drive-current and read/write-current conductors each including a defined current-conduction axis, and for each such related pair of conductors, magnetic pole structure inductively coupled thereto, said pole structure, with respect to the associated drive-current conductor, including a portion substantially completely surrounding the latter with respect to its said current-conduction axis, with said portion having an easy axis of magnetization which substantially parallels said current-conduction axis.

20. The structure of claim 19, wherein each of said drive-current conductors has a planar structure with opposed faces terminating in edges that substantially parallel the associated easy axis, and the associated portion includes a pair of spaced, planar expanses distrubuted over, and substantially coextensive with said faces.

21. The structure of claim 19, wherein each of said drive-current conductors includes a pair of spaced, substantially parallel, series-connected runs disposed on opposire sides of the associated read/write-current conductor.

22. The structure of claim 21, wherein each run has a planar structure with opposed faces terminating in edges that substantially parallel the associated easy axis, and the associated portion, for each run, includes a pair of spaced, planar expanses distributed over, and substantially coextensive with, the faces in the associated run.

23. The structure of claims 19, 20, 21 or 22, wherein said plural read/write-current conductors are connected in series to form a unitary conductive path which is common, vis-a-vis orthogonality, to all of said drive-current conductors.

* * * * *